July 6, 1971     S. L. BAZIL ET AL     3,591,461
MICRO-ORGANISM CULTURING PLATE
Filed Aug. 8, 1969
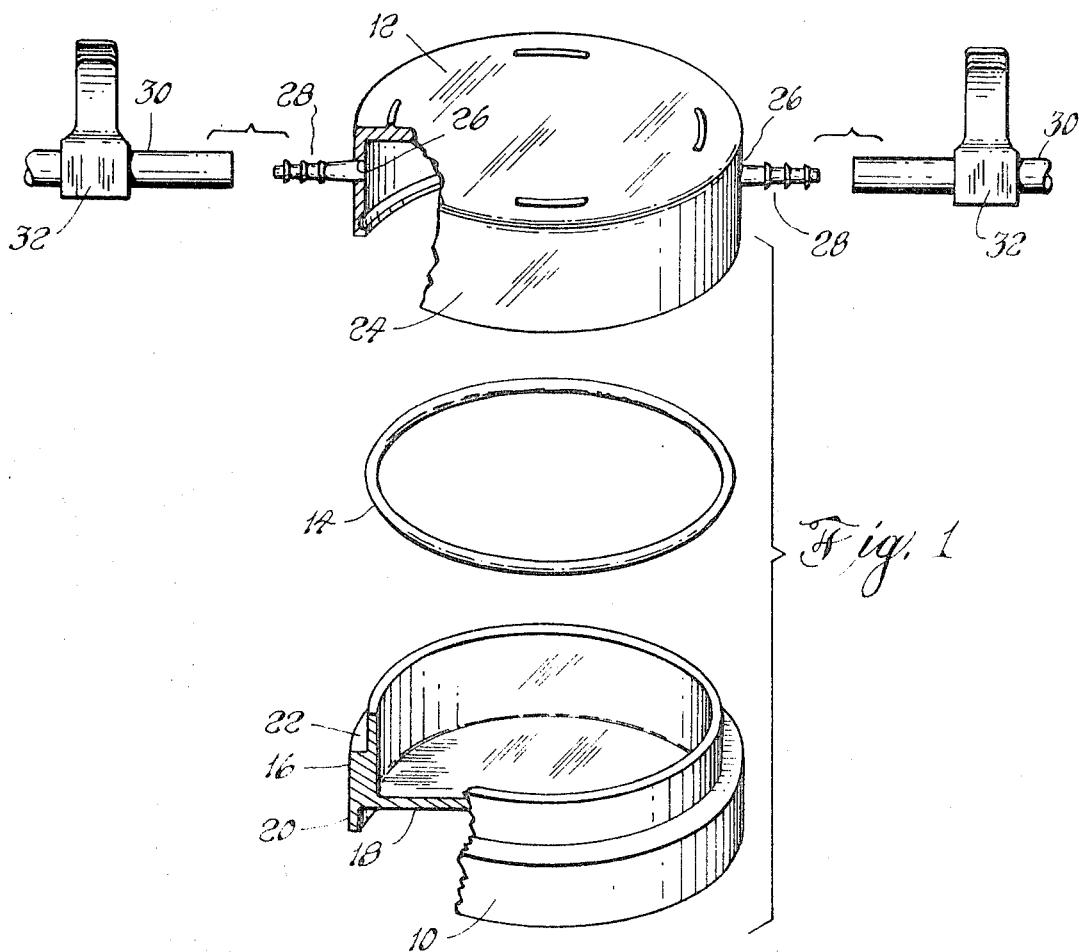
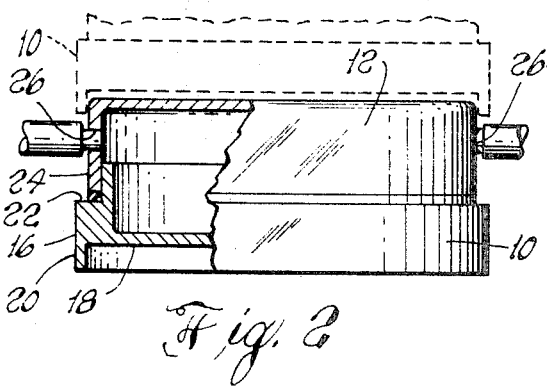
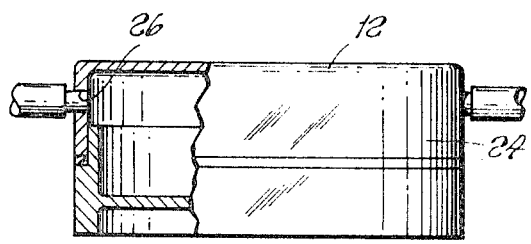
INVENTORS.
STEPHEN L. BAZIL
DAVID B. LAND
BY Arthur L. Bowers
AGENT

United States Patent Office 3,591,461
Patented July 6, 1971

3,591,461
MICRO-ORGANISM CULTURING PLATE
Stephen L. Bazil, 25 Catalpa Lane, Valley Stream, N.Y. 11581, and David B. Land, 57—05 Horace Harding Expressway, Flushing, N.Y. 11368
Filed Aug. 8, 1969, Ser. No. 848,433
Int. Cl. C12b *1/04*
U.S. Cl. 195—142                                                3 Claims

ABSTRACT OF THE DISCLOSURE

An improved micro-organism culturing petri-type plate including a specimen dish and a tightly fitting cover that forms a gas-tight seal with the specimen dish, the cover providing a gas space above the dish and having two opposed fittings for gas tubings with gas flow cut-offs, one of the tubings serving as a coupling to a supply of a specific gas.

---

The invention described herein may be manufactured and used by or for the Government of the United States of America for governmental purposes without the payment of any royalties thereon or therefor.

BACKGROUND OF THE INVENTION

The petri-type plate is a well known tool of the microbiologist. The unabridged Webster's Third New International Dictionary includes a sketch and describes the petri plate and petri dish as a small shallow dish of thin glass with a loosely fitting overlapping cover used especially for plate cultures in bacteriology. The terms petri plate and petri dish are used interchangeably to describe the same structure, which is generally transparent, on the order of two inches across for culturing aerobic bacteria. For culturing anaerobic bacteria, the petri dish is placed in a special incubator designed to provide an environment of a specific gas around the petri plate. This kind of incubator, capable of providing a selected gas environment is very expensive and presents complications in use.

SUMMARY OF THE INVENTION

The invention concerns a petri-type plate wherein the specimen dish and cover are made with a seat for a gasket or O-ring and form a gas-tight seal when assembled. The cover has two opposed tubular projections communicating with the interior of the cover. The cover is deep enough to provide a space above the dish for an isolated pocket of a selected gas to which the specimen in the dish is exposed during incubation.

Other objects, advantages and novel features of the invention will become apparent from the following detailed description of the invention when considered in conjunction with the accompanying drawings wherein:

FIG. 1 is a exploded view of a petri plate embodying the features of this invention;

FIG. 2 is a side view, partly broken away, showing a variation of the embodiment of FIG. 1; and FIG. 3 is a side view, partly broken away, showing an alternative construction for the embodiment shown in FIG. 1.

The embodiment in FIG. 1 includes a circular dish 10, a cover 12 for the dish and an O-ring 14. The dish includes a circular wall 16 and dish bottom 18 between the wall ends whereby part of the wall is a skirt 20 below the dish bottom. The outter surface of wall 16 is stepped at 22 whereby the upper part of the wall is of lesser thickness than the lower part. The cover 12 has a circular wall 24 of inside diameter for a tight fit with the upper part of wall 16, and is formed with a pair of approximately diametrically opposite perforations 26 into which are sealed tapered stepped fittings 28 for flexible tubing. Alternatively, flexible tubing ends may be sealed into the perforations 26. The latter is less convenient to package and store until used. The spacing between the perforations 26 and the open end of cover 12 is no less than the length of the lesser thickness portion of wall 16 so as not to be blocked by wall 16 when the cover 12 is pressed in place on the dish 10. The spacing between the fittings 28 and the closed end of cover 12 is no less than the distance between the dish bottom 18 and the end of skirt 20 for stacking in an incubator. The interior cover 12 between perforations 26 and the open end is formed with a circular seat for O-ring 14.

In use, the dish 10 is at least partially filled with clinically clean agar agar in the liquor state. After the agar agar is congealed, a specimen is dabbed, smeared, or wiped onto the surface of the agar agar. The cover with the O-ring in place is forced over the dish to seat against the shoulder. Lengths of flexible tubing 30 are forced onto the fittings 28. Both tubings are provided with pinch seals 32. A supply source, not shown, of a selected gas is coupled to the end of one tubing. The gas is flowed through the tubings to flush out the atmosphere within the cover. The gas supply is shut and the tubes are pinched closed. One plate unit or a plurality of stacked units are placed in an ordinary incubator. Incubation of the specimen takes place in the presence of the selected gas which occupies the volume above the agar agar.

Instead of an O-ring as in FIG. 2, a flat gasket may be supported by the shoulder 22 and compressed by the rim of the cover 12 against shoulder 22. This seal arrangement is less effective but involves less cost and may be adequate for some applications where some leakage may be tolerated and where the culture period is comparatively brief.

In the embodiment of FIG. 3, the circular wall of the base is straight rather than stepped as in FIG. 1 and the cover is stepped to form an enlarged mouth and an internal shoulder. The seal arrangement of either FIG. 1 or FIG. 2 may be used though that of FIG. 2 is shown.

We claim:

1. A petri-type plate for confining a selected gaseous environment over a specimen being cultured, comprising:
    a tightly fitting dish and cover,
    a gas seal gasket compressed between dish and cover,
    said cover having a pair of essentially diametrically opposed gas fittings for flexible tubing for channeling gas into and out of the interior of the cover.

2. A petri-type plate as defined in claim 1 wherein said gas fittings for gas tubing are flexible gas tubings.

3. A petri-type dish as defined in claim 1 wherein:
    the dish is stepped to form a portion adjacent the open end of the dish that is of reduced diameter for nesting tightly in the cover.

References Cited

UNITED STATES PATENTS 2,879,207    3/1959    Poitras _____ 195—139(LE)

ALVIN E. TANENHOLTZ, Primary Examiner